(12) United States Patent
Slavin

(10) Patent No.: US 7,254,281 B2
(45) Date of Patent: *Aug. 7, 2007

(54) METHOD AND APPARATUS FOR ELECTRONIC IMAGE PROCESSING

(75) Inventor: Keith Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/274,423

(22) Filed: Nov. 15, 2005

(65) Prior Publication Data

US 2006/0147127 A1  Jul. 6, 2006

Related U.S. Application Data

(63) Continuation of application No. 09/972,489, filed on Oct. 5, 2001, now Pat. No. 6,993,207.

(51) Int. Cl.
G06K 9/32 (2006.01)
G06K 15/00 (2006.01)
H04N 9/74 (2006.01)

(52) U.S. Cl. .................. 382/298; 348/581; 358/1.2; 345/660

(58) Field of Classification Search ................ 382/254, 382/264, 298, 300, 305; 345/439, 660, 667; 348/240.99, 425.3, 426.1, 567, 581; 358/1.1, 358/444, 1.2, 451; 708/313
See application file for complete search history.

(56) References Cited

U.S. PATENT DOCUMENTS

| 5,355,328 | A | 10/1994 | Arbeiter et al. |
|---|---|---|---|
| 5,559,905 | A | 9/1996 | Greggain et al. |
| 5,574,572 | A | 11/1996 | Malinowski et al. |
| 5,587,742 | A | 12/1996 | Hau et al. |
| 5,602,599 | A | 2/1997 | Greggain |
| 5,671,298 | A | 9/1997 | Markandey et al. |
| 5,696,708 | A | 12/1997 | Leung |
| 5,809,128 | A | 9/1998 | McMullin |
| 5,867,608 | A | 2/1999 | Rice |
| 5,926,121 | A * | 7/1999 | Kuwaoka ................. 341/100 |
| 5,930,407 | A | 7/1999 | Jensen |
| 6,137,914 | A * | 10/2000 | Ligtenberg et al. ........ 382/240 |
| 6,327,000 | B1 * | 12/2001 | Auld et al. ................. 348/441 |
| 6,339,434 | B1 | 1/2002 | West et al. |
| 6,424,749 | B1 | 7/2002 | Zhu et al. |
| 6,597,411 | B1 | 7/2003 | Selby et al. |
| 6,751,362 | B2 | 6/2004 | Slavin |

* cited by examiner

Primary Examiner—Kanjibhai Patel
(74) Attorney, Agent, or Firm—Perkins Coie LLP

(57) ABSTRACT

A method and apparatus for electronic image processing are described. One embodiment includes a method of resizing an electronic image that includes image data in two dimensions. The method includes memory-to-memory processing with separable x and y processing. Processing occurs in one or more memory-to-memory passes. On each pass, processing can be one of: low-pass filtering; low-pass filtering and decimation by two; and resampling. Processing is configurable independently in each dimension. Filters are configured on each pass and in each dimension to low-pass filter or obtain gradients for resampling. A multiplexor selects resampling or low-pass filtering on each pass.

14 Claims, 2 Drawing Sheets

METHOD AND APPARATUS FOR ELECTRONIC IMAGE PROCESSING

CROSS-REFERENCE TO RELATED APPLICATION

This application is a continuation of U.S. patent application Ser. No. 09/972,489, filed Oct. 5, 2001, now U.S. Pat. No. 6,993,207, issued on Jan. 31, 2006, and which is incorporated herein by reference in its entirety.

TECHNICAL FIELD

Disclosed embodiments of the invention are in the field of processing electronic image data, and more particularly in the field of electronic image resizing.

BACKGROUND

Electronic image data, such as data that creates a television image, must be processed in various ways to make it usable under different circumstances. For example, an image must be resized if it is to be displayed on a smaller screen than the screen for which it was originally formatted. Resizing involves the basic ideas of low-pass filtering, resampling, and decimation. Resampling a signal at a different rate is equivalent to converting a sampled signal to analog using a digital to analog converter (DAC), analog reconstruction filtering, and sampling at a new rate using an ADC, but a much better job can be done entirely in the digital domain.

The resample ratio (output pixels/input pixels) is always from one image to another. Typically, the source image to be resized is broken up into tiles, each of which is processed independently. The output image is re-formed from the tiles in such a way that the resulting picture is acceptable, and ideally no different from an image that had been processed as one large tile. For this precise behavior, the ratios can require as many bits to represent the numerator and denominator as would be needed to represent the largest image widths or heights.

To allow tiling, the top-left pixels of the source and destination images are chosen to be co-sited. A ratio between the images is determined such that one pixel beyond the right-most column of pixels in the source and destination images are also co-sited. The same applies vertically.

For an input sample rate of $f_{sample}$ down-sampled to a lower output sample rate $f_{resample}$, any original sampled frequency components f near (but by definition, less than) the Nyquist limit $f_{sample}/2$ may cause spectral aliasing.

$$\text{If } f_{resample} < f_{sample} \quad (EQ\ 1)$$

and $$f > \frac{f_{sample}}{2} \quad (EQ\ 2)$$

then spectral aliasing occurs at $$f_{alias} = f_{sample} - f \quad (EQ\ 3)$$

A polyphase filter system can do these two operations (in the required order) in one filter system, to generate each output sample. However, the polyphase filter approach comes with a high hardware cost, as each filter coefficient set has to form a low-pass filter, and multiple sets of such filter coefficients are required to generate the resampled signal at different output phases. The number of phases used should reflect the target precision of the system, and is usually derived by quantizing results from the ratioing sub-system (which can be implemented exactly using integer arithmetic). Because a polyphase filter will be used only for resizing the majority of the time, the amount of hardware required may not be justified. For example, a two-dimensional (2-D) polyphase filter requires a very large 2-D filter array with a high gate count for good quality frequency response characteristics with acceptable frequency aliasing. The 2-D polyphase filter also requires a large amount of random access memory (RAM) on each filter tap, and a high 2-D read access bandwidth into the polyphase filter. The high bandwidth requires a large amount of register file image storage rather than RAM.

One-dimensional (1-D) polyphase filters can be used for both limited low-pass filtering and resampling in the same pass, but they also require a relatively large number of gates. Another disadvantage is the relative complexity of designing the polyphase coefficients for each application. Even if only used for resizing, the new low-pass filtering characteristics have to be re-calculated for all the resampling phases. This makes dynamic resizing software for the 1-D polyphase filter much slower and less responsive to the user.

DETAILED DESCRIPTION

Figure 1:
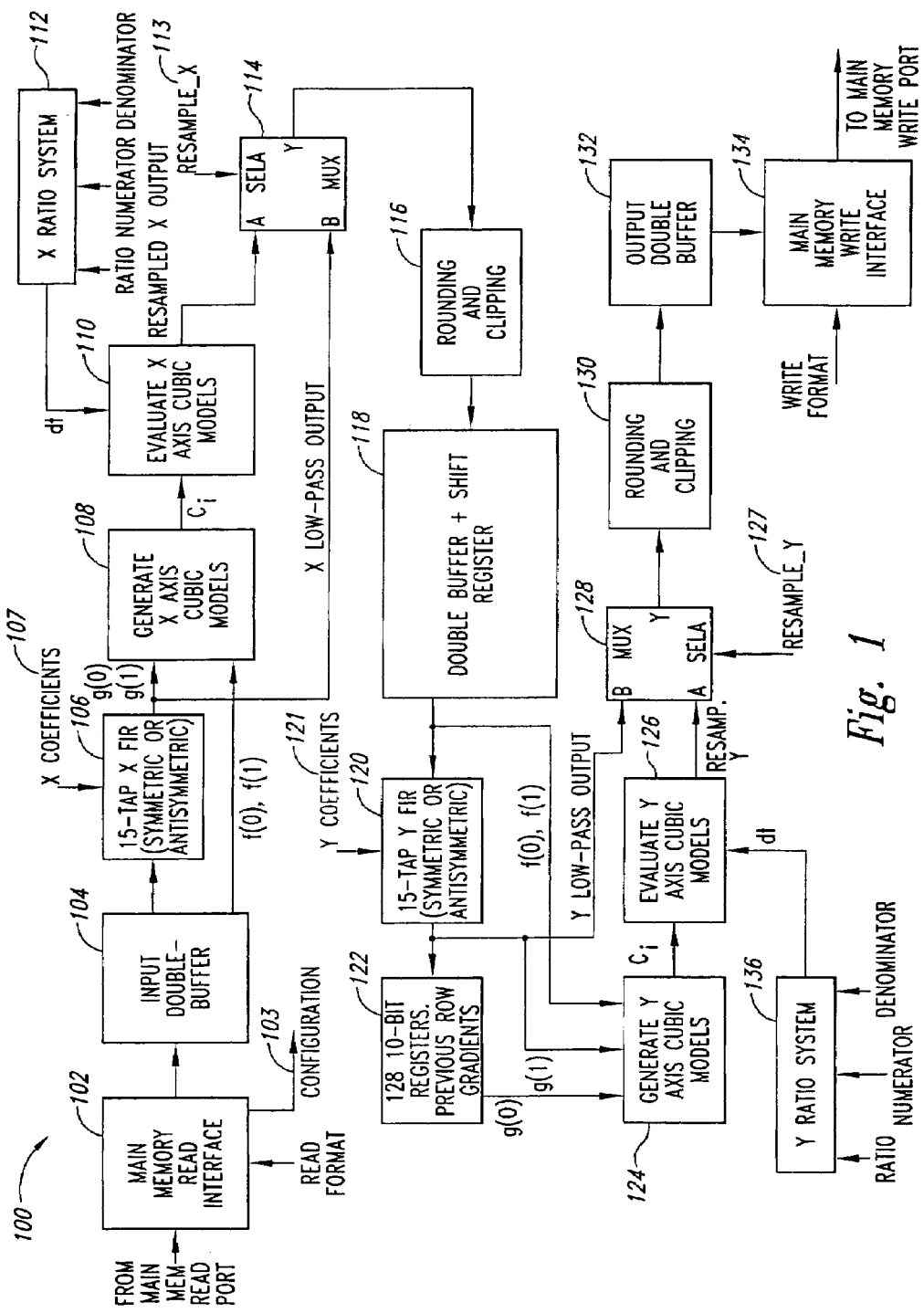
FIG. 1 is a block diagram of an embodiment of an image resizing engine.

The present invention overcomes the limitations of the prior art and provides additional benefits. A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims.

One embodiment is a resizing engine that takes a two-dimensional array of image samples from main dynamic random access memory (DRAM), resizes the image independently in x and y, and writes the new image back out to memory. The resizing engine receives image data in a stream of samples from a memory, processes the samples, and writes the processed samples back to the memory. The entire image is processed by the resizing engine in multiple passes until the resizing is achieved. In one pass, all of the samples making up the image are processed once. On each pass through the resizing engine, limited independent resizing operations can be achieved by the hardware in both x and y dimensions. Up-sampling between common formats, and down-sampling by two can be achieved in one pass. More extreme conversions, or down-sampling in general may require more passes.

Each pass can include the same or different processing, depending upon the configuration of various resizing engine components as explained more fully below. For example, in one embodiment, the resizing engine includes one finite impulse response (FIR) filter for processing x-axis data and one FIR for processing y-axis data. Each FIR filter is configured for each pass using predetermined filter coefficients. The FIR filters are configurable to perform various functions, including decimation by an integer factor, low-pass filtering, and generating signal gradients. The resizing engine communicates with memory through a wide data bus, achieving acceptable speed, yet economizing on hardware.

In one embodiment, two fifteen tap FIR filters are used to achieve good spectral performance. One FIR filter is used for each of the x and y axes. The resizing engine throughput performance is adequate for almost any high definition television (HDTV) resizing operations in YUV 4:2:0 in real time. In one embodiment, the gate count is approximately 150,000.

In one embodiment, a main dynamic random access (DRAM) memory is external to the integrated circuit chip of the resizing engine. The main memory may be internal, which may improve performance at the cost of size. An internal main memory interface is split up into banks, one of which is tied directly to the resizing engine for the highest performance. Other internal memory banks can be used with some performance degradation. A controlling processor (external to the resizing engine) is responsible for configuration of the resizing engine by writing data into allocated memory.

FIG. 1 is a block diagram of one embodiment of a resizing engine 100. A main memory read interface 102 receives streamed data from a main memory and stores it in an input double buffer 104. Any hardware design for the resizing engine should take into account the memory access overhead on each memory access burst. In one example embodiment, which will be described with reference to FIG. 1, this overhead is about 11 clocks, so reading or writing a single access burst is not very efficient. The input double buffer 104 alleviates this problem, because each buffer is large enough to allow larger memory access bursts when possible. Larger buffers allow for efficient memory bursts, but typically require more hardware than smaller buffer. Compromises, therefore, are usually made.

In one embodiment, each buffer in the input double buffer 104 is 128 samples wide, allowing input bursts of up to eight 128-bit memory reads at a time. Double buffering allows one buffer to be read while the other is being filled, helping reduce the latency and the impact of main memory access busy stalls. The number of samples actually read depends upon a resampling ratio in x, as 128*src_width/src_height, and is limited to 128 in any case. This precalculated configuration value 103 is stored in memory for each pass (see Table 2, address offset=19).

After a burst read, the next row below it (in image terms) is read as the next burst, and so on until a complete column has been read. The burst reads then starts at the top of the input image to generate the next output column, and so on. Overlap occurs when reading the input columns.

The output of the input double buffer 104 presents 15 samples at a time to the x-axis FIR filter 106, and two of the middle samples also go to the x-axis cubic model generator to give $f_T(0)$ and $f_T(1)$ (cubic polynomial interpolation is explained more fully below with reference to Equations 4-7).

The x-axis cubic model generator 108 generates the x-axis cubic models. The set of $C_i$ are then fed to the x-axis cubic model evaluator 110, which also uses the $\Delta t$ values from the x ratio system 112 to generate resampled x values.

The resampled x output from the x-axis cubic evaluator 110 and a low-pass filter output go to an x-multiplexor 114 which serves as a switch to select one of the two depending upon the value of the resample_x input 113, which is determined by the resample_x configuration (see Table 2, address offset 20). The low-pass filter output is generated by the x-axis FIR filter 106 when it is configured by the x coefficients 107 to perform low-pass filtering. The output of the x-multiplexor 114 is rounded and clipped to 10 bits by rounding and clipping circuit 116, and fed into an x->y intermediate random access memory (RAM) and shift register 118. The shift-register logic of the RAM and shift register 118 allows 15 new samples to be read from RAM on each clock in the y-axis direction. Each new sample from the x-axis processing is written into the top (15th) sample position of the RAM data. The previous samples are all shifted down by one, and the oldest, or first, sample is discarded from the bottom.

The shift register 118 efficiently provides 15 samples of vertical history. To do this in a pipelined fashion, short line delays (for example, 128 samples) are used. Shorter line delays are more economical, but increase overlapping memory access. The shift register 118 requires a clock for each read and write. In one embodiment interleaved RAM-shift-register systems 118 are used, and each RAM 118 is 64×(15×10) bits (where 64 is the number of lines/sample divided by two, and 10 is number of bits/sample). The item to be written from the shift register 118 back into the RAM 118 is also forwarded to the y-axis FIR filter 120 input. At each new input sample, the next RAM 118 address is processed, until there are no more samples to receive from the previous stage (as may be the case when down-sampling), or until the maximum of 128 samples is reached. This RAM stage is not double buffered, so the timing of the x-axis and y-axis processing has to be synchronized. Two of the center samples presented to the y-axis FIR filter 120 are also extracted as $f_T(0)$ and $f_T(1)$. The y-axis FIR filter 120 output is either the differentiating output (signal gradients "g") or low-pass filter output, depending on how the y coefficients 121 are configured.

The y-axis cubic models use each new gradient, $g_T(1)$ (see Equations 4-7), but the y-axis cubic models generated by the y-axis cubic model generator 126 also need the previous gradient, $g_T(0)$, for that same column index. A 128-gradient register 122 allows both gradients to be available in a timely manner for the cubic model construction, and then assigns the new gradient to replace the old gradient in the gradient registers, ready for the next time that column is reached.

The y cubic models, along with the $\Delta t$ produced by the y ratio system 136 are evaluated to obtain the resampled y-axis values. The resampled y-axis values are fed to a y multiplexor 128. The y-multiplexor 128 also receives a y low-pass filter output when the y-axis FIR filter 120 is configured by the y coefficients to perform low-pass filtering. The resample_y input 127 to the multiplexor 128 selects between resampled y-axis data or the y-axis low-pass data.

Unlike the x-axis multiplexor 114 output, the y-axis multiplexor 128 output can be rounded to 8 for efficient storage, or 10 bits for higher quality. The output is then fed to the output double buffer 132. The main memory write interface receives the processed image data from the output double buffer 132 and transmits the processed image data to the main memory. In one embodiment, there is an additional y-axis cubic model evaluator 126 (not shown for simplicity).

Two y-axis cubic model evaluators 126 can generate more than one y output sample for every new y-axis cubic model. This makes a significant performance improvement when vertically up-sampling, particularly at ratios near 2:1. These new samples must be absorbed into the output buffer 132 rows, but supporting too many rows becomes expensive in chip area. Most vertical up-sampling ratios are likely to be 4:1 or less, in which case four rows are sufficient.

After the resampled number of columns has been generated, one buffer is ready to be read to memory in a burst, while the other buffer is ready to be written to. In one embodiment, 128 columns is the maximum number that can be generated. The data should be read out along columns instead of rows, so to avoid supporting different read and write organizations. In one embodiment, the processed image data is organized in the main memory as 4 rows×8 columns of addressing, with 16×8 bits of data at each address. The memory address is given by 8*row+column for zero-based indexing. A buffer read of 128 bits (16 samples of 8 bits each, or 8 samples of 16 bits each) can be made on each clock for efficient 9 (or 8 if aligned) clock write bursts to main memory. With 11 clocks of overhead for each horizontal burst write, 1024 bits or 128 samples can be written out to the main memory in 20 clocks. Four such bursts (one for each row) empty a buffer RAM.

Writing to the output double buffer 132 requires byte write enables into the 128-bit output buffer memory because 1 to 4 samples of data (depending upon the y up-sample ratio) are written into a column before moving on to the next column. Each column therefore completes in 1 or 2 clocks. In one embodiment, up to two samples per clock can be generated. The samples cannot be written into different rows of the output buffer RAM in one clock, however, because different rows have different output buffer RAM addresses. In one embodiment, this problem is solved by using a small intermediate register file (for example, a register file of two columns by four rows) to allow accumulation of four clocks worth at two samples per clock. Two write samples per clock can then be transferred into the output buffer RAM using byte enables. This also completes in four clocks (one clock per row). To allow continuous operation, two of these small register files are needed for double buffering within each output buffer. The output from the output double buffer 132 is formatted by the main memory write interface 134 for writing to the main memory in 128-bit bursts where possible.

Figure 2:
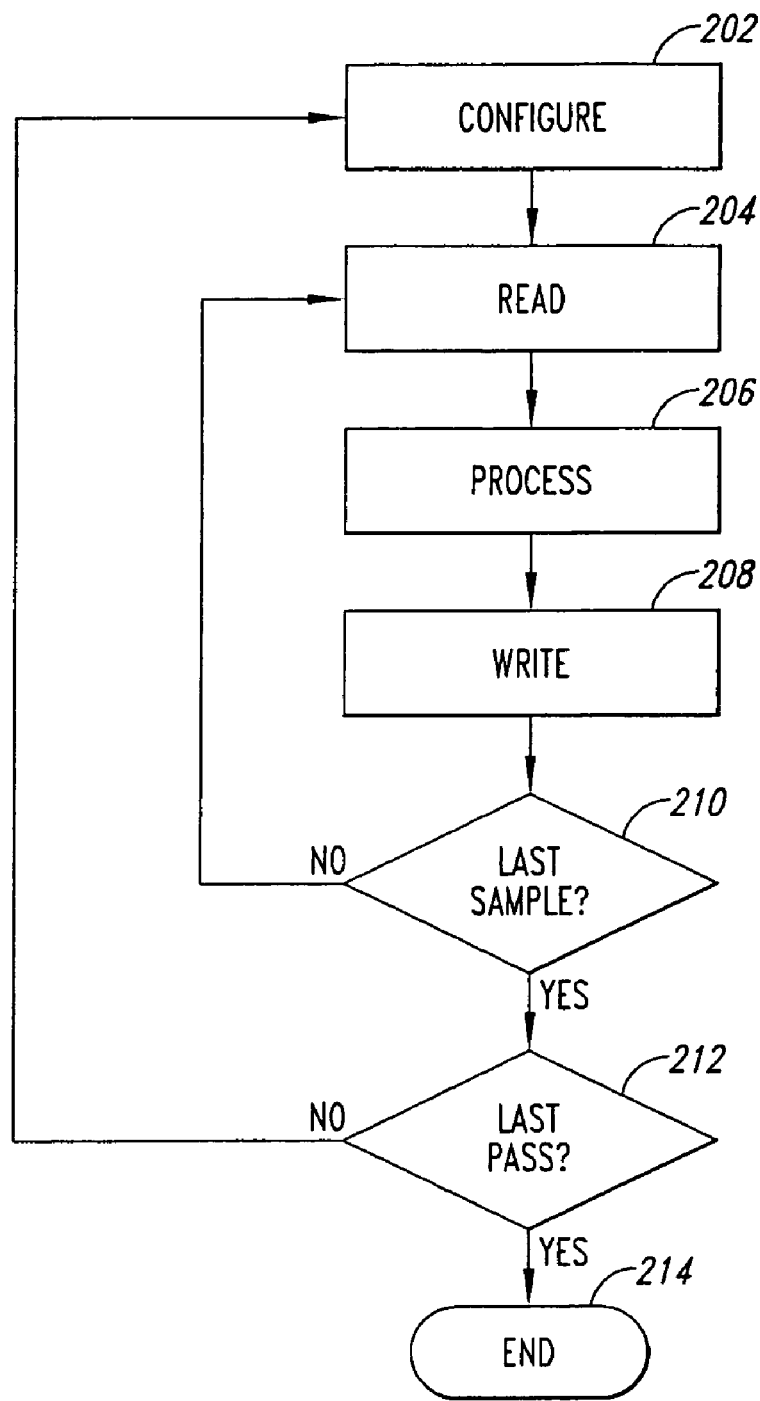
FIG. 2 is a flow diagram of an embodiment of a resizing operation.

FIG. 2 is an overview of how image data is processed and stored in an embodiment of a resizing operation using the resizing engine of FIG. 1. The resizing engine components are configured 202 for a pass using data that was previously determined and stored. A software routine controls the resizing engine, including configuring resizing engine components. In one embodiment, the software routine and the configuration data reside remotely from the resizing engine. The configurable components include the FIR filters 106 and 120, the multiplexors 114 and 128, and the ratio systems 112 and 136.

Samples are read 204 into the resizing engine from the external memory, and the samples are processed 206 as previously described (and further described below). The samples are processed according to the configuration of the resizing engine components. Processed samples are written 208 back to the main memory. It is determined 210 whether the sample just processed is the final sample of the image to be processed. If the sample is not the final sample of the image to be processed, a next sample is read 204 and processed 206. If it is the final sample, it is determined 212 whether the pass just completed was the final pass of the resizing operation as dictated by the software routine. If the last pass completed was not the final pass, the resizing engine is configured 202 for the next pass. If the pass just completed was the final pass, the resizing process is finished 214.

The software routine configures the resizing engine appropriately for each pass with certain goals in mind. For example, it is typically desirable to plan passes through the resizing engine such that the image size is reduced as quickly as possible. The filter selection (as configured by coefficients) may be the same for each low-pass filtering operation, or it may be different. A selection of pre-defined filters is available to use on each pass. It is logical to perform decimate-by-two by filtering first if the overall ratio of decimation is down by two or more. The final low-pass filtering pass should perform filtering to match any remaining resampling, which should be on the last pass of the operation. In the case of decimation by two, low-pass filtering and removal of every other sample (½ original size) can occur in one pass.

As an example of a resizing operation that can be performed by the resizing engine of FIG. 1, consider decimation by ten as follows:

Pass1—low-pass filter to ½ of bandwidth and decimate by two (½ original size);
Pass2—low-pass filter to ½ of bandwidth and decimate by two (¼ original size);
Pass3—low-pass filter to ½ of bandwidth and decimate by two (⅛ original size);
Pass4—low-pass filter to nearest 8/10 (⅘) of bandwidth (The image is still ⅛ original size); and
Pass5—decimate by 5/4 or 10/8.

This is 1/10 of original size (note that 1/10=⅛×8/10). The filter is used calculations in pass 5.

Various details of embodiments of the resizing methods implemented by the resizing filter 100 will now be discussed in more detail.

In one embodiment, a number of low pass filters is used to down-sample by various ratios as low as two, and decimation by larger factors is performed with multiple passes. The number of low-pass filters, as referred to herein, is the number of different configurations of the same filter hardware (x-axis FIR filter 106 or y-axis FIR filter 120) by different sets of x or y coefficients. This does not require that the filters have truly optimal low-pass filter characteristics. Even though some ratios may be slightly overly low-pass filtered ("over-filtered"), this is more desirable than allowing aliasing. The set of low-pass filter characteristics may be logarithmically ratioed to provide uniform worst-case over-filtering.

The various filters defined by the sets of coefficients should be designed to balance the pass-band and stop-band impairments. For example, increased ripple in the pass-band causes in-band picture impairments. Increased ripple in the stop-band allows frequency aliasing. It is also desirable to be able to use symmetric FIR filters because of their predictable delays at all frequencies. In the absence of any known input signal characteristics, satisfactory filters are obtained when so-called equi-ripple FIR filter designs are used. In one embodiment, these are designed using Chebyshev polynomials, for example, optimized using an iterative Remez-exchange algorithm. Different FIR filter designs could be used in other embodiments.

Except for down-sampling by the maximum of two on a pass combined with decimation by two (also referred herein as decimation by two), low-pass filtering does not change the data rate from input to output along an axis.

In the case of down-sampling by two in a pass, the down-sampling is accomplished by discarding every other sample (decimation by two) immediately after filtering. In the case of down-sampling by two, a single FIR filter is configured to perform both down-sampling and low-pass filtering in one pass. Combining low-pass filtering and down-sampling by two into one pass provides considerable performance benefits. To prevent aliasing in this case, low-pass filtering down to $f_{sample}/4$ is performed before decimation.

To get good performance for multiple passes of decimation by two, it is desirable to have a low-pass filter that can pass sampled frequencies from zero to $f_{sample}/8$, so that after decimation the pass-band becomes $f_{sample\_new}/4$. The sample is then ready for filtering in the next pass. If the pass-band further is reduced further, more frequency response errors may be accumulated in the pass-band. If the pass-band is increased, there is a narrower transition band to the stop-band. As a consequence, longer filters would have to be used. Alternatively, more frequency response ripple in the pass-band or stop-band would have to be accepted. Decimation by larger factors is achievable, but the pass-band would be very narrow, and the transition band very steep. Filter performance would therefore be inadequate for most high quality processing.

In one embodiment, a general resampling ratio system is used to control the decimation. With an appropriate low-pass filter design, lower quality decimation by four in one pass is possible, but with lower picture quality for the same filter length.

Resampling is implemented in one embodiment by creating piece-wise polynomial models $f_T(\Delta t)$ at discrete sample times T of the input sample signal, such that each model is a good approximation to the continuous signal over each fractional sample time interval ($0 \leq \Delta t < 1$).

One such method of creating piecewise polynomials is to use a cubic polynomial, and fit it to four consecutive samples nearby (e.g. at T={-1,0,1,2}). This approach does not perform well near the Nyquist limit, however, because the equations are ill-conditioned and provide poor model constraints. Also the equations to derive the polynomial coefficients are relatively complex, and thus require more hardware. A better approach is to obtain the gradient g(T) of the sampled signal, co-sited with each sample f(T), and then use the four known values {f(0),g(0),f(1),g(1)} to obtain the cubic coefficients. This approach makes better use of more localized constraint information. If a piece-wise cubic model at time T defines a waveform at any fractional time $\Delta t$ (known as a Vandermonde system):

$$f_T(\Delta t) = \sum_{i=0}^{3} C_i (\Delta t)^i \quad \text{(EQ 4)}$$

then differentiating with respect to $\Delta t$ yields:

$$g_T(\Delta t) = \sum_{i=1}^{3} i C_i (\Delta t)^{i-1} \quad \text{(Eq 5)}$$

If we evaluate these two equations at times $\Delta t=\{0, 1\}$, we obtain:

$$f_T(0)=C_0$$

$$f_t(1)=C_3+C_2+C_1+C_0$$

$$g_T(0)=C_1$$

$$g_T(1)=3C_3+2C_2+C_1 \quad \text{(EQ 6)}$$

These types of equation systems (consisting of Vandermonde matrices and their derivatives) are known to always have a solution, which in this case allows us to find each $C_i$ as:

$$C_0=f_T(0)$$

$$C_1=g_T(0)$$

$$k=f_T(1)-f_T(0)$$

$$C_2=3k-g_T(1)-2g_T(0)=k-C_3-g_T(0)$$

$$C_3=g_T(1)+g_T(0)-2k \quad \text{(EQ 7)}$$

using just five add operations.

The set of $C_i$ are re-evaluated at every new input sample, and they are linearly proportional to the input. The gradient is linearly proportional to the input, also. From Equation 4, the resampled output is also a nonlinear function of $\Delta t$, but as this is purely a function of the reconstructed sample position, and not the input data. The path from sample input to reconstructed sample output is then linear as required.

As discussed earlier, resizing requires low-pass filtering. Using a low-pass FIR filter is a fairly compact solution, compared for example to a polyphase design. Furthermore, low-pass FIR filters with reconstructed delays that are an integer multiple of the sampling period are symmetric, so a 2n−1 tap filter can be implemented with n multipliers.

If a pass with resampling and low-pass filtering at the same time is never done, the co-sited gradients $g_T$ can be obtained using the low-pass FIR filter hardware, but with a new set of coefficients designed for differentiating instead. This is not considering decimation by two, which does not use the resampling system in any case. In one embodiment the filter coefficients are designed for an equi-ripple differentiating response using Remez-exchange techniques. This filter is anti-symmetric; the coefficient magnitudes are symmetric, but with the mirrored coefficients inverted in sign. See Table 1 for a list of differentiating filter coefficients.

In one embodiment, a direct form FIR filter is chosen because block processing is performed on the image data. For symmetric and anti-symmetric filters, the appropriate image samples are added or subtracted, respectively. The results are multiplied by their coefficients, and all the results are added in an equal delay piped adder tree structure. A more conventional transversal FIR filter structure would not be a practical choice because of the clock overhead that comes with filling its pipeline.

In one embodiment, resizing engine hardware is conserved by defining the filter coefficients using an external processor and storing them in a configuration memory. The configuration memory can be any memory external to the resizing engine. Any filter characteristic can be defined as long as it is symmetric or anti-symmetric to take advantage of filter folding to share multipiers. In one embodiment, the filter has a total of 15 or fewer taps. The filter characteristics along the x and y axes are independently definable for each pass. In one embodiment, a set of eight low-pass filters (logarithmically spaced) is defined.

Hardware and algorithm distortions must be balanced in order to obtain an acceptable level of overall performance. Performance considerations for one embodiment that uses the resizing engine of FIG. 1 will now be discussed.

For each axis 1% overall distortion over most of the sampled frequency range is considered acceptable, with a degradation to around 1.5% (6 bits) near a target upper range of 0.8 of the Nyquist limit ($f_{sample}/2$). Less than 3% distortion is obtained when x and y processing is combined. By comparison, with the same designed frequency response range, practical polyphase designs would struggle to achieve 34% distortion overall for a 5×5, or 22% distortion overall for a 7×7 (49 tap) 2-D design.

If it is assumed that exact gradients can be obtained, the cubic algorithm described above has about a 5% error at the Nyquist limit, reducing rapidly with the fourth power of the sampled frequency to around 2% at a target upper sampled frequency. Gradients above the target do not have to be generated, but there is excessive gain in the cubic algorithm as we near the Nyquist limit. Reducing e gradient values slightly from their correct value actually improves the algorithm performance near the Nyquist limit. A fortuitous property of equi-ripple differentiating filters is that they underestimate the gradient beyond the desired equi-ripple differentiating response region, and about 1.5% distortion at 0.8 of Nyquist is obtainable in an equi-ripple differentiating filter pass-band region designed to end at this point.

A differentiating filter with pass-band equi-ripple of 0.7% from 0.0 to 0.8 of the Nyquist limit needs a 15-tap FIR filter (8 multipliers). The coefficients obtained for one equi-ripple design are as shown in Table 1.

TABLE 1

Differentiating Filter Coefficients (anti-symmetric) for 15-tap FIR

| Coefficient index | Anti-symmetric coefficient index | Coefficient value |
|---|---|---|
| h[0] | −h[14] | +0.00178016 |
| h[1] | −h[13] | −0.00561604 |
| h[8] | −h[12] | +0.01139131 |
| h[3] | −h[11] | −0.02120364 |
| h[4] | −h[10] | +0.03763856 |
| h[5] | −h[9] | −0.06853024 |
| h[6] | −h[8] | +0.15338417 |
| h[7] |  | 0.0 |

Note that the coefficients are subsequently scaled up by $2\pi$ to normalize the gradient to angular frequency.

In order to match the algorithm performance, the arithmetic should be evaluated at a higher level of precision than the algorithm performance, but not so high as to incur too much hardware. Evaluation to 10-bit two's complement signed should be sufficient, with intermediate input and output formats rounded to 8 bits for maximum performance. A 16-bit intermediate format can be configured for each pass at the cost of higher memory bandwidth (see Table 3). Two's complement number representation is used internally because many values can be negative (e.g., gradients). Unsigned values are translated to a two's complement signed range for first pass input, and translated back again for output on the last pass. The FIR filter should use filter coefficients with two extra bits of precision, and four extra bits of multiplier output precision compared to other processing. The FIR filter should truncate the multiplier outputs for circuit economy. The average direct current (DC) errors introduced by the truncations may be compensated for at the filter output.

Once a set of cubic polynomial coefficients are obtained from Equation 6, then Equation 4 is evaluated using Horner's rule as:

$$f_T(\Delta t) = ((C_3 \Delta t + C_2) \Delta t + C_1) \Delta t + C_0 \qquad (EQ\ 8)$$

This requires only three multiply operations and three add operations.

In one embodiment, the same 15 tap filter used for low-pass filtering is also used for differentiation. In this case, a transition band of approximately $0.125\ f_{sample}$ is supported, with about 1.3% ripple in the pass-band and stop-band. In particular, this allows a filter that can be configured for decimation by two (pass-band from 0 to $0.125\ f_{sample}$, and stop-band from 0.25 to $0.5\ f_{sample}$) as was discussed earlier. Other filters can be pre-designed at logarithmically spaced intervals for the lower band-stop edge frequencies (which are used to characterize and select the filter because of the objectionable effects of aliasing). The resulting transition and pass-band responses should be very acceptable visually.

Like any reconstruction system based on sinc interpolation, the filter characteristics outlined above will ring on sharp edges or impulses in the source image. In such cases, the FIR filters can be configured to apply low-pass Gaussian-style filtering in the first pass, at the cost of some throughput performance.

Embodiments of resampling models and generating $\Delta t$ will now be discussed. If b is the number of output samples to generate for each of a input samples, an embodiment of the resizing engine is designed to achieve at least the following things. The algorithm controls when to progress to a new input sample set and generate a new resampling model. The algorithm derives the $\Delta t$ values for Equation 8 evaluation within each model. For correct tiling behavior, the algorithm results in the generation of precisely b output samples for every a input samples. The algorithm uses all integer arithmetic for circuit economy and more deterministic behavior. One satisfactory method of approaching this problem is to build a separate time accumulation circuit that indicates when to generate new output samples, and at what fractional time $\Delta t$. A separate correction circuit causes the accumulation circuit to correct for any long term accumulation errors given that it is accumulating time as a binary approximation.

The time accumulation circuit accumulates a time step into an n+e bit binary value ratio, which represents time with e most significant bits as the sample time, and n least significant bits as the fractional time $\Delta t$. If the sample time is represented by any finite e bits, the time value would eventually overflow. If the actual polynomial model being used is represented as being relative to the e-bit representation within the ratio value, however, the sample time can be decremented every time a new input sample, or model, is processed. If the sample time is zero, the fractional time is used to generate an output value from the cubic model; otherwise no output sample is generated. If the time step is more than a sample time, then at some input sample times the sample time will accumulate to a value greater than or equal to two. In this case, even after the decrement by one per new input sample, no output samples will be generated. Down-sampling per pass is only restricted by the length of the FIR filters, which in practice would do a poor job (e.g., around 11% peak aliasing for unity response at 0 Hz, and an anti-aliasing stop-band at $0.5/8 = 0.0625\ f_s$) for any factor over about half the number of filter taps. A real limit on e must be set here. At a 250 MHz clock rate, the number of bits representing the accumulated ratio value should be kept as small as possible. The maximum value of the sample time required for a down-sampling of d:1 is d−1. For example, for each input sample possibly arriving at each clock, increment the sample time by time step d, and simultaneously decrement it by 1. If d=8 is allowed, the maximum sample time value is 7, and this can be represented in e=3 bits. The same restriction is placed on both axes. Ten bits should be used to represent the fractional time, as this should match the basic data path precision for a balanced system design. Then 13 bits are required in total.

If, after accumulating the time step into the ratio value, the sample time is still zero, then another output sample is generated at the new fractional time value. Accumulation is repeated until the sample time is greater than zero. This allows several output samples to be generated from one input model.

Ratio is represented as an approximation to the true ratio value, with n bits of fractional time (note that ratio will only be exact if b divides exactly into $a*2^n$):

$$\text{ratio} = \text{floor}\left(\frac{a \times 2^n}{b}\right) \quad \text{(EQ 9)}$$

From the definition of the floor( ) operator, we know that:

$$\text{ratio} \leq \frac{a \times 2^n}{b} < \text{ratio} + 1 \quad \text{(EQ 10)}$$

A second circuit can now be designed that generates a correction signal with an average value from 0 to less than 1, which is added to the ratio value, such that the average value of the corrected ratio is then exactly correct. The average value of this correction signal can be represented as a rational fraction numerator/denominator, such that:

$$\frac{a}{b} = \frac{\text{ratio} + \frac{\text{numerator}}{\text{denominator}}}{2^n} \quad \text{(EQ 11)}$$

From Equation 9 and Equation 11 we find:

numerator=$(a \times 2^n)$−(ratio×b) \quad (EQ 12)

denominator=b \quad (EQ 13)

It can also be shown that:

0≤numerator<denominator \quad (EQ 14)

which limits the range of correction as required.

The arithmetic for finding the ratio, numerator and denominator above is only needed for a new a and/or b, and involves division and multiplication. The calculations shown above are performed by an external processor and passed to the resizing engine as part of configuration. The resizing engine resamples independently along each axis, so each requires separate calculations. The values are programmed into the resizing engine configuration for each pass (see Table 2). Note that from Equation 14, the number of bits (say m) representing the numerator and denominator values must be equal, but that the number of bits (n) representing ratio is independent of the others. In practice, the number of bits that represent all these values in hardware is limited. Larger widths or heights may be supportable in certain cases if a and b share prime factors that can be cancelled out, or if numerator and denominator also share prime factors. Shared prime factors can easily be found using Euclid's greatest common divisor (GCD) algorithm. In one embodiment, these optimizations are performed in the external processor.

The resizing engine (for example, the x ratio system 112, and the y ratio system 136 of FIG. 1) makes real-time use of the configured ratio, numerator and denominator values to step through new cubic models, and to generate output samples for the appropriate number of Δt values within each model.

An algorithm for the correction-generating circuit can be expressed in hardware ("pseudo-code") as:

```
module correction_generator:
    input: clock, numerator[m], denominator[m], reset;
    output: correction;
    {
        // two's complement, large enough to hold m-bit denominator
        register: accumulator[m+1];
        wire: correction;
        wire: delta[m+1]; two's complement value
        // continuous assignments
        if (accumulator > = 0) // msb is sign bit for two's complement
            {
                correction:= 1; // apply bump correction to circuit 2
                // accumulate numerator modulo denominator
                delta := numerator − denominator; // m-bit result
            }
        else
            {
                correction := 0;
                delta:= numerator;
            }
        // positive-edge clock triggered register assignments
        for each posedge clock
            {
                if reset
                    accumulator <− (−1); // −1 is two's complement
                    all −1 's
                else
                    accumulator <− (accumulator + delta);
            }
}
```

Note that the number of bits m allocated to the numerator and denominator must be large enough to represent the ratios required. In our case 12 bits would be sufficient, allowing for all image resizing combinations up to pictures of 4095 in width and height.

An algorithm for the dt and next_model control-signal generation is:

```
module dt_generator:
input: clock, ratio, correction, reset;
output: next_model, dt;
    {
        register accumulator[n]; // unsigned
        wire: next_val[n + 1];
        // continuous assignments
        next_val:=accumulator + ratio + correction;
        next_model:=next_va[n]; // overflow bit set =>
        skip to next cubic model
```

-continued

```
// positive edge clock triggered register assignments
for each posedge clock
    {
        if reset
            accumulator <- 0;
        else
            accumulator <- next_val[n-1]. .01]; // discard
                overflow bit
    }
    dt: = accumulator;
}
```

Configuration and control of embodiments of the resizing engine will now be discussed. In one embodiment, a controlling processor external to the resizing engine is responsible for configuration of the resizing engine by writing data into allocated memory and setting the address of the configuration data at the appropriate offset into a vector interrupt table. A vector interrupt table base address is set by a separate register. An offset into the table for the resizing engine is assigned. When the resizing engine signals it is ready, for example by asserting a ready input, the resizing engine reads the address at its offset into the table, de-asserts its ready input, and starts to run. The resizing engine first reads the configuration data pointed to by the vector interrupt table. The first item is an address of the set of data needed to control the next pass. In one embodiment, the item is a linked list. Byte addressing is used.

To make the hardware simpler, all addresses should be aligned to 128-bit (16 byte) memory access boundaries (the bottom four address bits are always zero). All other values within a resizing engine pass configuration are 16-bit aligned (see Table 2). When the current pass is finished, the new linked-list address is the base address for the next pass. If the address is NULL (0), then it is assumed that there are no more passes following the current pass. When the resizing engine has finished, it re-asserts the ready signal. In one embodiment, the only additional interface signals required are signals to communicate with the memory interface and a system clock. All memory access is 128 bits (16 bytes) at a time.

A pixel src_format allows the resizing engine to read and filter through just the samples of interest (for example, just Y in the AYUV format) and ignore the others. While it might be more efficient for the resizing engine to read and resize more than one sample type in a format in the same pass at the same time, this requires considerably more hardware.

The specification of a pixel at the top left of an image is achieved by calculating its 128-bit aligned address externally. The data format must be known in order to tell the resizing engine how to read it. The src_offset of pixels of the selected type (defined by the format) are then calculated within each 128-bit memory access. In one format that is Y samples only, represented by each byte, there are up to 16 Y samples in each memory access, so four bits are required.

TABLE 2

Configuration Contents for Each Pass

| 16-bit addressing offset | Type | Description |
| --- | --- | --- |
| 0 pass_next | 30-bit address | Address of next past data |
| 2 src_addr | 30-bit address | Address of top left image pixel to resize |
| 4 dest_addr | 30-bit address | Address of top left resized output image pixel |
| 6 src_format | unsigned 4 bit | bits 0-3 source data format (undefined) |
| dest_format | unsigned 4 bit | bits 4-7 destination data format (undefined) |
| src_offset | unsigned 4 bit | bits 8-11, source sample offset within access |
| dest_offset | unsigned 4 bit | bits 12-15, dest. sample offset within access |
| 7 src_width | unsigned 12 bit | source image width (<=src_stride) |
| 8 src_height | unsigned 11 bit | source image height |
| 9 src_stride | unsigned 10 bit | source 128-bit memory stride for down 1 pixel |
| 10 dest_width | unsigned 12 bit | destination image width (<=dest_stride) |
| 11 dest_height | unsigned 11 bit | destination image height |
| 12 dest_stride | unsigned 12 bit | dest.128-bit memory stride for down 1 pixel |
| 13 horiz_ratio | unsigned 10 bit | ratio steps through source pixels horizontally |
| 14 horiz_num | unsigned 12 bit | numerator for horizontal ratio correction |
| 15 horiz_denom | unsigned 12 bit | denominator for horizontal ratio correction |
| 16 vert_ratio | unsigned 10 bit | ratio steps through destination pixels vertically |
| 17 vert_num | unsigned 12 bit | numerator for vertical ratio correction |
| 18 vert_denom | unsigned 12 bit | denominator for vertical ratio correction |
| 19 x_burst_len | unsigned 8 bit | number of samples to burst-read in x |
| 20 resample_x | unsigned 1 bit | bit 0, 1 = resample in x, 0 = low-pass filter in x |
| Resample_y | unsigned 1 bit | bit 1, 1 = resample in y, 0 = low-pass filter in y |
| Unsigned_in | unsigned 1 bit | bit 2, 1 = unsigned value, 0 = two's complement |
| Unsigned_out | unsigned 1 bit | bit 3, 1 = unsigned value, 0 = two's complement |
| 8_tap_fir_x | unsigned 1 bit | bit 4, 1 = no x FIR symmetry, 0 = symm/antisymm |
| 8_tap_fir_y | unsigned 1 bit | bit 5, 1 = no y FIR symmetry, 0 = symm/antisymm |
| 24 x_fir_0 | signed 10 bits | coefficient 0 for x FIR filter |
| . . . | signed 10 bits | . . . through other taps to . . . |

TABLE 2-continued

Configuration Contents for Each Pass

| 16-bit addressing offset | Type | Description |
| --- | --- | --- |
| 31 x_fir_7 | signed 10 bits | coefficient 7 for x FIR filter (center tap) |
| 32 y_fir_0 | signed 10 bits | coefficient 0 for y FIR filter |
| ... | signed 10 bits | ... through other taps to ... |
| 39 y_fir_7 | signed 10 bits | coefficient 7 for y FIR filter (center tap) |

Note that all values lie in the bottom bits of each memory location unless otherwise stated.

Table 3 describes the different input (source) and output (destination) data formats (eight bits per value unless otherwise noted):

TABLE 3

Data Formats

| Type | 32-bit value | Description | |
| --- | --- | --- | --- |
| 0 | YYYY | I/O | 8 bits per sample* |
| 1 | UVUV | I/O | 8 bits per sample |
| 2 | AYUV | I/O | 8 bits per sample |
| 3 | YYYYUV | I | 5 bits per Y sample, 6 bits per U or V, not byte aligned |
| 4 | YY | I/O | 16 bits per sample, the top 10 bits are used* |

*Format appropriate for intermediate working storage on multiple passes.

Note that a non-byte aligned format cannot be written out, as it needs bits from other sample types to write each byte to memory. The overhead of reading the previous values and combining them back in is probably too high because of the high memory bandwidth.

An external program is responsible for deciding what passes are needed and how to program each pass to achieve the minimum memory bandwidth usage. Once a particular ratio in x and y is selected, the program sets up a list of resizing engine instructions for each pass. For a given image resizing operation, this list of instructions does not change. A pass may either resample, low-pass filter, or low-pass filter and decimate by two. All intermediate storage required for multiple passes is allocated by the external processor. Processing subsequent source images may require changing the source image pointer defined in the first pass instruction block, and the destination pointer defined in the last pass instruction block. All intermediate image storage used between passes can be re-used for each new source image. To save on intermediate memory, all passes relating to a particular sample type should be programmed to occur before handling a different sample type. For example, in a YUV format, complete all passes on Y, then all passes on U, etc.

If the resizing operation is resizing downwards by large factors (e.g. for Picture-In-Picture effects), decimation by two should be used to perform most of the down-sampling in multiple stages. However, down-sampling by two requires an even number of source samples, so down-sampling by S stages requires S factors of two in the source width or height. If this is not the case, a first up-sampling pass may be required to get the smallest possible larger image where this is true.

The processing performed by the resizing engine on each of the x and y axes is completely independent. For example, up-sampling in the x-axis can be accompanied by decimation by two in the y-axis on the same pass. Completely separate decision-making software must therefore be implemented for each of the axes.

If decimation by two is needed, it is desirable to decimate by two as soon as possible to get the amount of data down as quickly as possible for subsequent processing. If up-sampling by factors greater than four is needed vertically, it is desirable to up-sample as late as possible, and to up-sample by factors of four in the last passes, so that higher data rates are postponed as long as possible.

Fractional down-sampling by values between one and two may require two passes. The first pass can use a logarithmically selected pre-designed low-pass filter to reduce any possible aliasing frequency components before resampling. This does not change the data rate. The second pass can then safely resample to a lower rate without aliasing.

The src_stride value is the number of 128-bit memory locations from a sample at image coordinate (x, y) to (x,y+1). For example, if a YYYY format (0) is used, each sample is 8 bits, and 16 samples lie in each 128-bit memory access. If the image is 360 samples in width, there are 22.5 such 16-sample reads. An integer src_stride value greater or equal to this is needed, so 23 is used. To resize the entire source image, src_width would be set to 360, and src_height would be set to the height of the image to be resized. The resizing engine ignores any additional lines in memory.

Resizing from a part of a source image (e.g. zooming) can be accomplished by setting the src_width configuration value to be the width of the image to be zoomed. The value of the src_stride value does not change, as this is based on the full image width. If the part of the image to be zoomed is not at the left edge, then the src_addr value can be changed to point to the top left 128-bit memory location where it lies. The src_offset value can then be set to pick out the sample within that memory location.

Table 4 lists example RAM requirements for one embodiment.

TABLE 4

| RAM size | Instances | Total bits (all instances) | Purpose |
| --- | --- | --- | --- |
| 8 × 160 | 2 | 2,560 | Input double buffer |
| 64 × 150 | 2 | 19,200 | x –> y intermediate RAM |
| 32 × 160 | 2 | 10,240 | Output double buffer |
|  | 6 | 32,000 | Grand total |

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. For example, the image resizing describes processes image data in two dimensions, x and y. It is possible to apply the teachings herein to three-dimensional data as well. The teachings of the invention provided herein can be applied to other data processing systems, not only to the method and apparatus described above.

The elements and acts of the various embodiments described above can be combined to provide further embodiments. These and other changes can be made to the invention in light of the above detailed description. In general, the terms used in the following claims should not be construed to limit the invention to the specific embodiments disclosed in the specification, unless the above description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. An apparatus for resizing an electronic image comprised of image data, the apparatus comprising:
    a main memory read interface coupled to a main memory and configured to receive the image data;
    an input buffer coupled to the main memory interface and configured to format the image data received from the main memory interface;
    a finite impulse response (FIR) filter coupled to the input buffer and configured to receive samples of the image data to be processed, the FIR filter being adapted to perform at least one of a group of operations on the samples of image data in all dimensions on each pass through the image data, the group of operations including (a) low-pass filtering, (b) decimation by two, and (c) differentiating to produce signal gradients;
    a processor coupled to the FIR filter and adapted to configure the FIR filter for each pass using predetermined filter coefficients;
    a cubic model generator coupled to the FIR filter, wherein the cubic model generator is configured to receive a signal gradient output; and
    a cubic model evaluator coupled to the cubic model generator, wherein the cubic model evaluator is configured for evaluating a cubic model and generating a resample output.

2. The apparatus of claim 1, further comprising a ratio system coupled to the cubic model generator, wherein the ratio system is configured for generating (a) a $\Delta t$ value using a predetermined resampling ratio, (b) a predetermined numerator, and (c) a predetermined denominator, wherein the cubic model evaluator evaluates a cubic model using the $\Delta t$ value.

3. The apparatus of claim 2, further comprising a multiplexer coupled to (a) the cubic model evaluator for receiving the resample output, and (b) the FIR filter for receiving a low-pass filtering output, wherein an output of the multiplexer is selected based upon a current configuration of the FIR filter.

4. An apparatus for resizing an image having image data in multiple dimensions, the apparatus comprising:
    a memory configured for storing image data; a memory interface operably coupled to the memory;
    one or more filters configured to process data in each of the multiple dimensions, the one or more filters being adapted to perform at least one of a group of operations during one pass of the image data, the group of operations including (a) decimation by two, (b) low-pass filtering, and (c) generating signal gradients for resampling, wherein the image data is processed in at least one pass and stored as processed image data in the memory;
    one or more cubic model generators configured to receive a signal gradient output for a certain one of the multiple dimensions and generate a cubic model for the certain one of the multiple dimensions; and
    a ratio system for each of the multiple dimensions, wherein each of the ratio systems is configured to (a) receive a predetermined resampling ratio comprising a numerator and a denominator, and (b) generate a $\Delta t$ value for resampling.

5. The apparatus of claim 4, further comprising a cubic model evaluator for each of the multiple dimensions, wherein the individual cubic model generators are configured to (a) receive the $\Delta t$ value and the cubic model for one of the multiple dimensions, and (b) generate a resample output for the certain one of the multiple dimensions.

6. The apparatus of claim 5, further comprising a multiplexer configured to receive the resample output and a low-pass filter output of the at least one filter, wherein the multiplexer output is configurable based on an operation selected for a current pass.

7. The apparatus of claim 4, further comprising an input buffer coupled to the memory interface, wherein the input buffer is configured to receive image data from the memory and format the image data into samples for the one or more filters.

8. The apparatus of claim 4, further comprising an output buffer coupled to the memory interface, wherein the output buffer is configured to (a) receive processed image data, and (b) format the processed image data to be stored in the memory.

9. The apparatus of claim 4 wherein the one or more filters include a fifteen tap FIR filter, and wherein each tap receives a sample of the image data.

10. A system for resizing an image that includes image data in multiple dimensions, the system comprising:
    a main memory configured to store the image data, configuration data, and control data;
    a memory interface operably coupled to the main memory and configured to receive the image data, store the image data, and format the image data into samples;
    a resizing engine configured to perform different operations on the image data on different passes of the image data through the resizing engine, the resizing engine being operably coupled to the memory interface to read formatted data from the main memory and to output processed image data back to the main memory, the resizing engine including a filter for each of the multiple dimensions, wherein the individual filters process data in corresponding multiple dimensions, the individual filters being adapted to perform at least one of a group of operations during one pass, the group of operations including (a) decimation by an integer factor, (b) low-pass filtering, and (c) generating signal gradients;

wherein the resizing engine further comprises a cubic model generator for each of the multiple dimensions, the individual cubic model generators being configured to receive a signal gradient output from the filter, and generate a cubic model for the certain one of the multiple dimensions; and a controlling processor operably coupled to the resizing engine and configured to execute instructions to control the resizing engine, including instructions for calculating coefficients for configuring the resizing engine to perform different operations on the image data, and (b) instructions for configuring the resizing engine for each pass.

11. The system of claim 10 wherein the resizing engine further comprises a ratio system for each of the multiple dimensions, and wherein each of the ratio systems is configured to (a) receive a predetermined resampling ratio for one of the multiple dimensions, and (b) generate a Δt value for the certain one of the multiple dimensions.

12. The system of claim 11 wherein the resizing engine further comprises a cubic model evaluator for each of the multiple dimensions, the individual cubic model evaluators being configured to (a) receive a cubic model and a Δt value for one of the multiple dimensions, and (b) generate a resample output for the certain one of the multiple dimensions.

13. The system of claim 12 wherein the resizing engine further comprises a multiplexer configured to receive the resample output and a low-pass output of one or more of the filters, and wherein a select input of the switch is configurable based on a current configuration of the one or more filters.

14. The system of claim 10 wherein the controlling processor is configured to control the resizing engine to generate b output samples for each of a input samples, and wherein the controlling processor further comprises:

a time accumulation circuit to indicate (a) when to begin processing new samples from the memory interface, and (b) when to configure the resizing engine to perform a different operation;

a correction circuit to cause the time accumulation circuit to correct for any accumulation errors from binary approximation; and a controlling processor operably coupled to the resizing engine to execute instructions to control the resizing engine, including (a) instructions for calculating coefficients for configuring the resizing engine to perform different operations on the image data, and (b) instructions for configuring the resizing engine for each pass.

* * * * *

UNITED STATES PATENT AND TRADEMARK OFFICE
CERTIFICATE OF CORRECTION

| | |
|---|---|
| PATENT NO. | : 7,254,281 B2 |
| APPLICATION NO. | : 11/274423 |
| DATED | : August 7, 2007 |
| INVENTOR(S) | : Slavin |

Page 1 of 1

It is certified that error appears in the above-identified patent and that said Letters Patent is hereby corrected as shown below:

In column 20, line 2, in Claim 12, delete "At" and insert -- $\Delta t$ --, therefor.

Signed and Sealed this

Twentieth Day of November, 2007

JON W. DUDAS
*Director of the United States Patent and Trademark Office*